United States Patent [19]

Kalinoski et al.

[11] Patent Number: 5,209,125
[45] Date of Patent: May 11, 1993

[54] PIEZOELECTRIC PRESSURE SENSOR

[75] Inventors: Richard W. Kalinoski, Rumford, R.I.; Gordon W. Chitty, Norfolk; James H. Vignos, Needham Heights, both of Mass.

[73] Assignee: The Foxboro Company, Foxboro, Mass.

[21] Appl. No.: 676,038

[22] Filed: Mar. 27, 1991

Related U.S. Application Data

[63] Continuation-in-part of Ser. No. 455,058, Dec. 22, 1989, Pat. No. 5,003,827.

[51] Int. Cl.$^5$ .............................................. G01F 1/32
[52] U.S. Cl. .................................. 73/861.24; 73/720; 73/754; 73/DIG. 4
[58] Field of Search .......... 73/861.24, 861.22, DIG. 4, 73/726, 721, 754, 753, 720, 723, 756, 727, 119 A, 717; 310/338

[56] References Cited

U.S. PATENT DOCUMENTS

| | | | |
|---|---|---|---|
| 3,269,175 | 8/1966 | Sprosty | 73/DIG. 4 |
| 4,258,565 | 3/1981 | Sawayama et al. | 73/DIG. 4 |
| 4,262,544 | 4/1981 | Herzl | 73/861.24 |
| 4,437,350 | 3/1984 | Tamura et al. | 73/861.24 |
| 4,475,405 | 10/1984 | Corpron et al. | 73/720 |
| 4,526,040 | 7/1985 | Matsubara | 73/861.24 |
| 4,559,832 | 12/1985 | Burlage et al. | 73/DIG. 4 |
| 4,776,222 | 10/1988 | Lew | 73/861.22 |
| 4,862,750 | 9/1989 | Nice | 73/861.24 |

FOREIGN PATENT DOCUMENTS 0063431 4/1982 Japan ................................. 73/706

OTHER PUBLICATIONS

The Electrical Conductivity of LiNbO$_2$, G. Bergmann, 1968, Gas Flow Restrictors and Controlled Leaks, Mott Metallurgical Corporation.

*Primary Examiner*—Donald O. Woodiel
*Attorney, Agent, or Firm*—Lahive & Cockfield

[57] ABSTRACT

A vortex sensor 14 measures a flow rate of a fluid flowing through a flow passage by detecting alternating pressure variations 26a and 28a generated by a shedding body 16 placed in the flow passage. The vortex sensor 14 includes a sensor housing 32 enclosing piezoelectric sensing elements 62, 64 which are acted on by a movable member 30. The lifetime of the sensing elements in the closed interior is enhanced by providing surface barriers, oxidizing exposed interior surfaces, or providing a gas reservoir. In applications where fluid leakage may be accepted, a controlled leak restrictor provides a limited rate diffusion path to the atmosphere allowing a minimum partial pressure of oxygen to be maintained.

24 Claims, 11 Drawing Sheets

PIEZOELECTRIC PRESSURE SENSOR

This is a continuation-in-part of United States patent application Ser. No. 455,058, filed Dec. 22, 1989, now U.S. Pat. No. 5,003,827.

FIELD OF THE INVENTION

The present invention relates to sensors for vortex shedding flowmeters and to piezoelectric sensor assemblies.

BACKGROUND OF THE INVENTION

Conventional vortex shedding flowmeters include a bluff body or shedder placed in a fluid for generating alternating vortices downstream of the shedder, a phenomenon known as a Von Karman vortex street. The frequency and amplitude of these vortices are typically detected and measured by pressure sensors in order to determine the mean flow velocity. The frequency of the generated vortices is linearly proportional to the mean flow velocity, and the amplitude of the pressure pulse is proportional to the square of the flow velocity times the fluid density.

Sensors used to detect the vortices often include diaphragms which fluctuate in response to alternating pressure variations generated by the vortices. For example, in U.S. Pat. No. 3,948,098 to Richardson et al., pressure applied to the diaphragms is transferred to a piezoelectric bimorph device sealed within a sensor housing via an electrically non-conductive hydraulic fill fluid. This type of sensor, however, cannot be used for measuring the flow velocity of extreme temperature fluids, because of the temperature limitations of the fill fluid, and the piezoelectric bimorph.

Meters used for measuring high temperature fluids, such as steam, are constructed without fill fluids. These meters include a shedder in the fluid flow path which oscillates or vibrates as vortices are "shed" from opposite sides thereof. These vibrations induce bending moments which are detected by a pair of sensors hermetically sealed in the vortex shedder. An example of this type of meter is shown and described in U.S. Pat. No. 4,437,350 to Hisashi Tamura, et al.

Since these devices rely on the detection of vibrations of the shedder, the sensors are made to be highly sensitive for detecting slight oscillations. This high sensitivity coupled with the very large mass of the shedder (approaching 500 grams in larger meters), however, makes them adversely susceptible to mechanical vibrations transmitted through the pipe and the shedder. To eliminate this noise, the sensors in the patent to Tamura above consists of two piezoelectric sensing elements which are both electrically divided with respect to the neutral axis of the shedder for symmetrically dividing the oscillations into tensile and compression stress components. In essence, the sensing elements act as if there were four independent sensing elements. Complicated circuitry is then required to compare the signals from each piezoelectric element for cancelling out the vibration and common mode noise components of the signal.

SUMMARY OF THE INVENTION

It is therefore an object of the present invention to provide an improved piezoelectric vortex sensor that is insensitive to mechanical vibration and common mode pressure pulsations.

It is another object of the present invention to provide a piezoelectric sensor with improved longevity or better aging characteristics.

It is a further object of the present invention to provide a piezoelectric vortex sensor which transmits vortex pressure variations to a piezoelectric detector without requiring a fill fluid or a vibrating shedder.

It is yet a further object of the present invention to provide a replaceable piezoelectric vortex sensor.

An advantage of the present invention is that simple electronic circuitry is required for detecting signals that result from pressure variations applied to the piezoelectric detector.

Another advantage of the present invention is that it is a simple mechanical structure that is capable of detecting small pressure fluctuations at extreme temperatures.

This invention results from the realization that a low mass, piezoelectric vortex sensor which transfers vortex pressure variations to a sensing element can be manufactured by sandwiching a piezoelectric crystal between each side of a sensor housing and a flange of a spool-like actuator. When the actuator shuttles back and forth in response to alternating vortices, different compressional forces are exerted on the crystals. These forces cause the crystals to generate signals which are indicative of passing vortices.

This invention features a piezoelectric vortex sensor which includes a sensor housing having a first and a second cavity interconnected by a channel. A spool-like actuator, having an axle and a flange member connected proximate to each end of the axle, is slideably disposed in the channel of the sensor housing for allowing each of the flange members to shuttle back and forth in response to alternating vortex pressure variations. Piezoelectric sensing means are disposed between the flange members and the sensor housing for generating signals in response to forces mechanically applied to them. Means for detecting signals are interconnected to the sensing means for detecting the generated signals.

In a preferred embodiment, the means for detecting preferably comprises a charge amplifier for detecting signals generated by the sensing means. In the alternative the means for detecting can include a charge amplifier interconnected to each sensing means for detecting the generated signals and a summing circuit for combining the output signals of each amplifier to reduce common mode noise. Further, the piezoelectric sensing means is a lithium niobate piezoelectric crystal. The vortex sensor can include diaphragm means for interconnecting each flange member to the sensor housing thereby sealing the cavities and a bias means, disposed in each cavity, for coupling the forces applied to each flange member to the sensing means. The bias means may further include spring means, preferably a Belleville washer, for uniformly biasing an insulating disk against the piezoelectric sensing means.

In accordance with another aspect of the invention piezoelectric crystals are housed within the sensor housing sealed from but in mechanical communication with a surrounding sensing medium. Means are provided to compensate for degradation of the crystal characteristics normally caused by depletion of oxygen around the crystals.

BRIEF DESCRIPTION OF THE DRAWINGS

The foregoing and other objects, features and advantages of the invention will be apparent from the following more particular description of a preferred embodiment of the invention, as illustrated in the accompanying drawings in which like reference characters refer to the same parts throughout the different views. The drawings are not necessarily to scale, emphasis instead being placed on illustrating the principles of the invention.

DETAILED DESCRIPTION OF THE INVENTION

The present invention utilizes a low-mass, piezoelectric vortex sensor which is removably placed in a meter body having a shedder placed across the path of a fluid flow to generate alternating vortices. The sensor includes a spool-shaped actuator that shuttles back and forth with respect to a sensor housing when exposed to the alternating vortices. The sensor further includes a piezoelectric crystal and a bias mechanism sandwiched between each side of the sensor housing and a flange of the actuator. When pressure forces the actuator to shuttle to one side of the sensor housing, stress on one crystal is increased and on the other crystal is relaxed. Each crystal generates signals as a result of this stress which are detected by a charge amplifier. The charge amplifier produces an output voltage that is used to determine the frequency of the generated vortices. While the description of the preferred embodiment is directed to a high temperature vortex meter, it will be understood by one skilled in the art that the described vortex meter can be used for all temperature applications including cryogenic applications.

In accordance with another aspect of the invention, however, the invention specifically includes a sensor operated at high temperatures. In accordance with this aspect, a sensor element is housed in an inner housing that has a structure to provide a controlled oxygen environment about the sensor elements.

Figure 1:
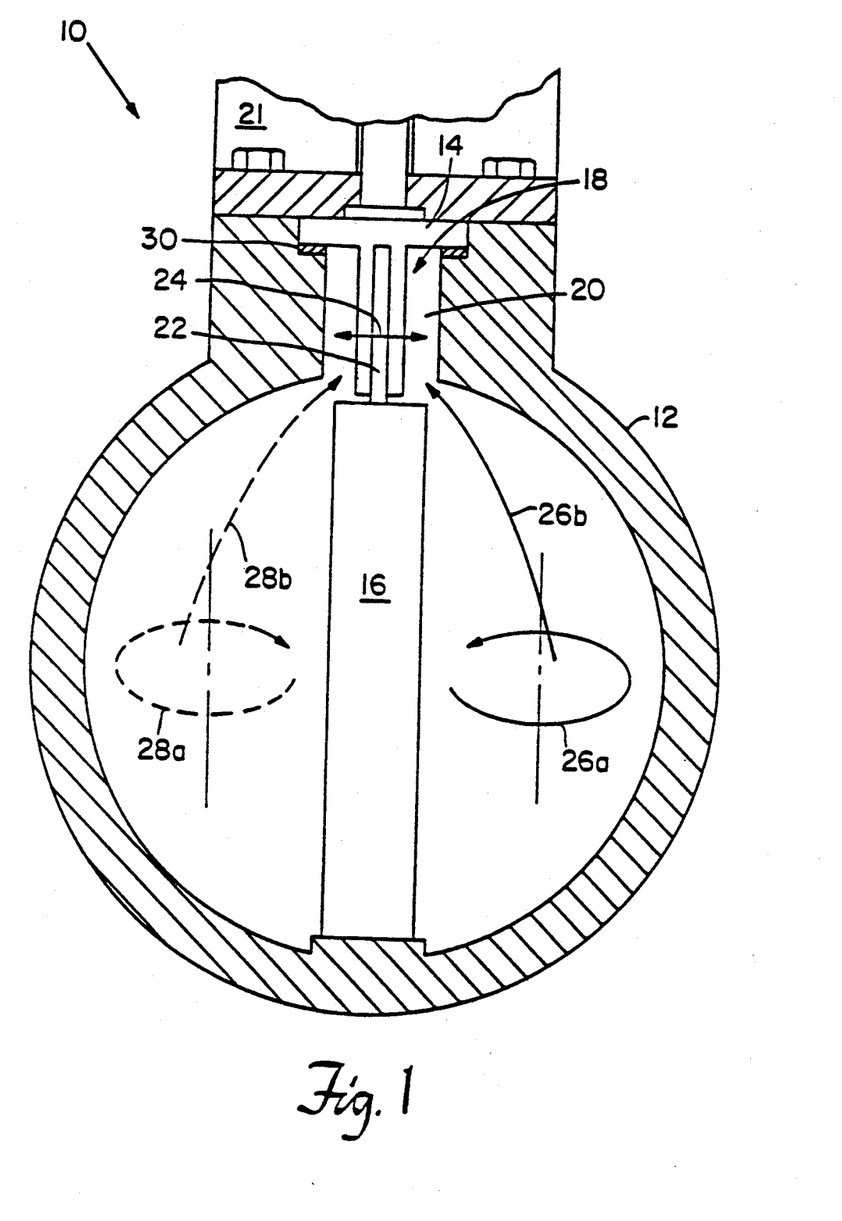
FIG. 1 is a cross-sectional view of a piezoelectric vortex sensing meter having a vortex shedder placed in a fluid flow passage for generating alternating vortices and a replaceable piezoelectric vortex sensor constructed according to the principles of this invention for detecting the alternating vortices.

Referring now to FIG. 1, the present invention includes a vortex shedding meter 10, which primarily consists of a meter body 12, a piezoelectric sensor 14, and a shedder body 16. The piezoelectric vortex sensor 14 extends through a cylindrical opening 18 of meter body 12 and against vortex shedder 16. Sensor 14 is secured in place by a cap 21 bolted to meter body 12. This construction permits sensor 14 to be easily replaced, if it becomes damaged. Sensor 14 divides a fluid cavity 20, defined by opening 18, into two halves. A gasket 22, which is preferably made of suitable high-temperature material, creates a seal between the walls of fluid cavity 20 and shedder 16.

The sensor is oriented such that its sensing direction is perpendicular to shedder 16 (as indicated by a double headed arrow 24) and along the direction of fluid flowing through meter body 12 (for example into the pipe). This orientation permits sensor 14 to detect the alternating pressure signals 26b and 28b caused by vortices 26a and 28a. As suggested by solid arrows 26a and 26b and the dashed arrows 28a and 28b, the pressure signals are alternately transferred to each half of fluid cavity 20 and are 180 degrees out of phase with each other. A second gasket 30, preferably made of high-temperature material, is secured between sensor 14 and meter body 12 to prevent external leakage of fluid.

Figure 2:
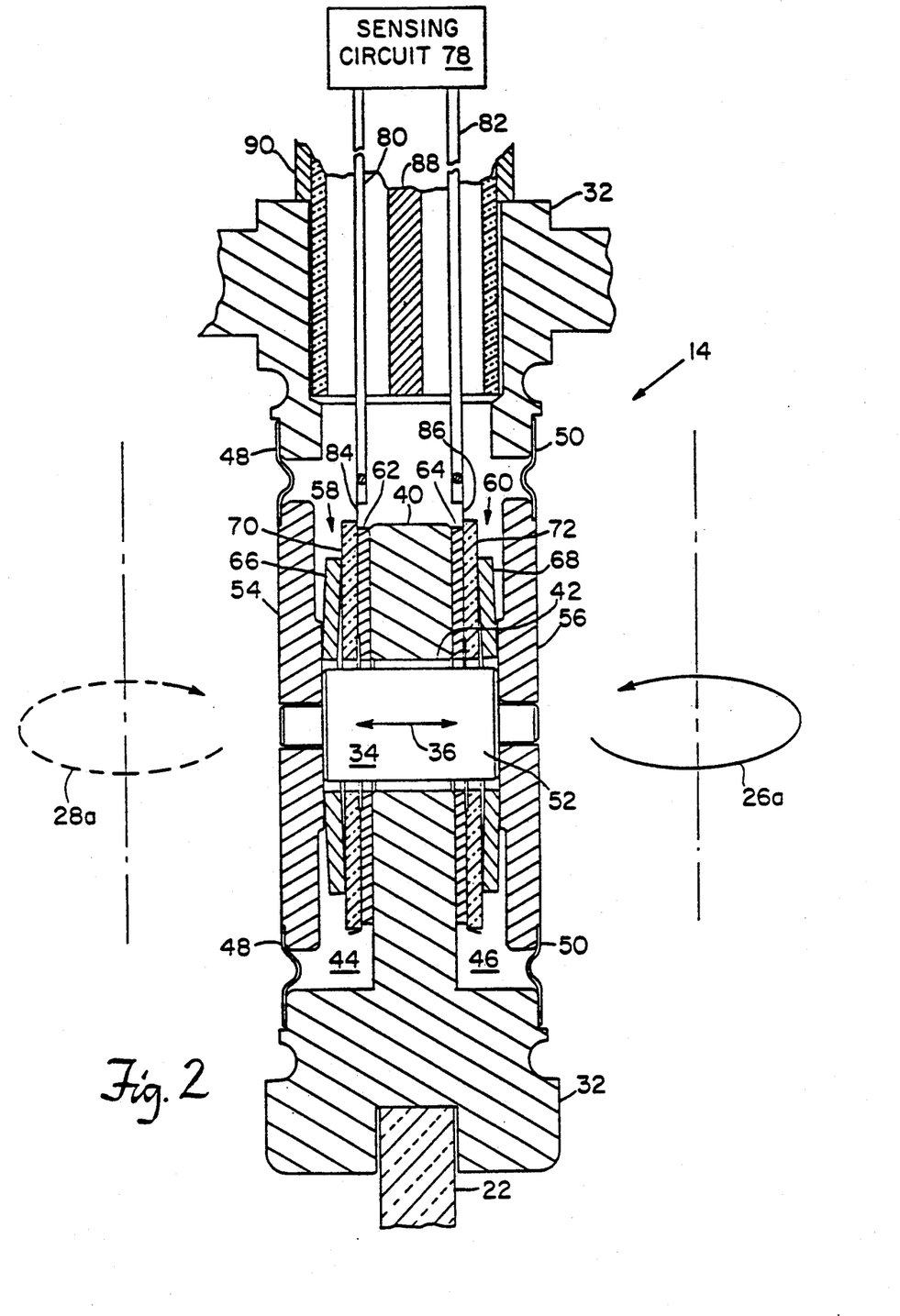
FIG. 2 is an enlarged cross-sectional view of the piezoelectric vortex sensor shown in FIG. 1.
Figure 3:
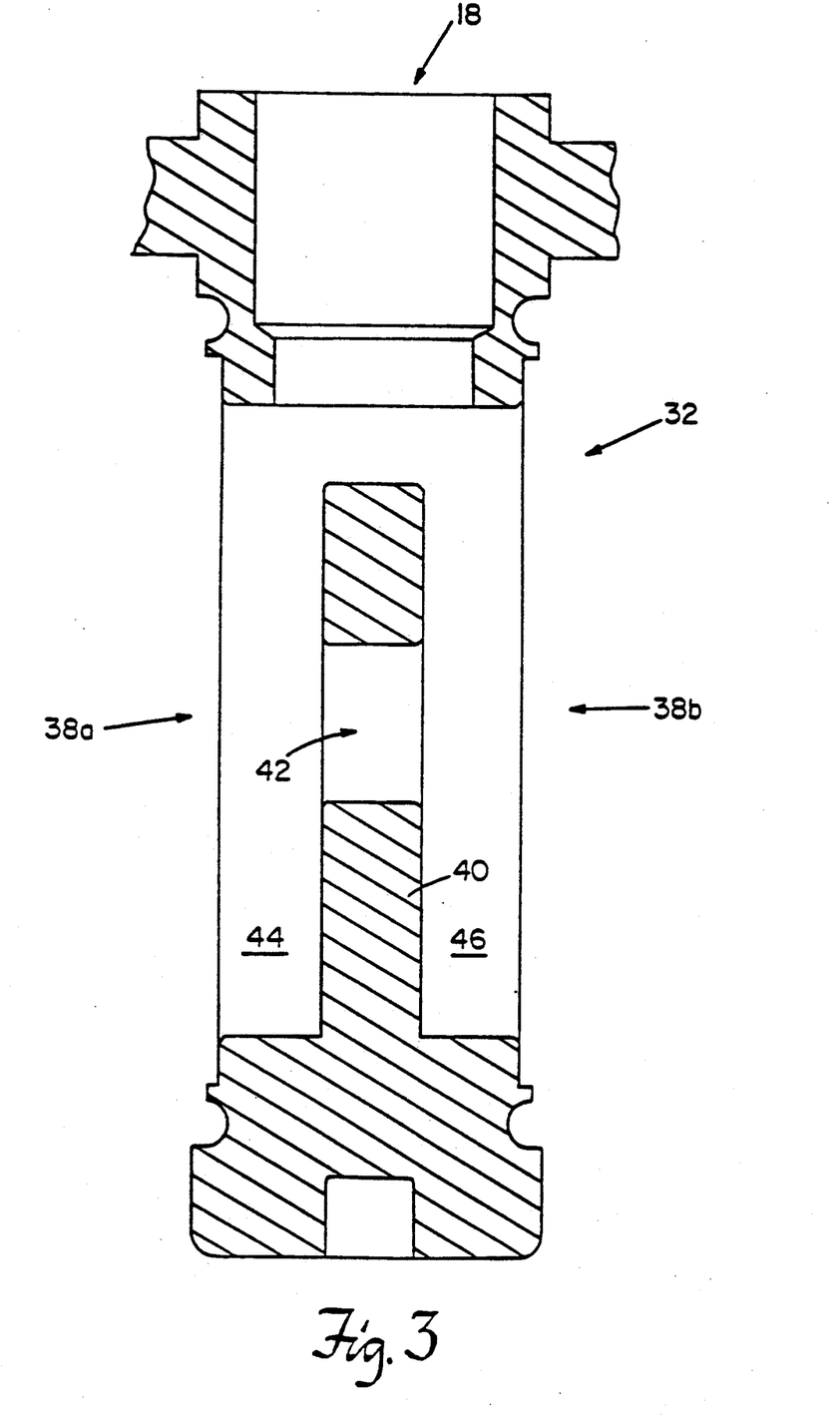
FIG. 3 is a sectional view of the sensor housing shown in FIG. 2.

A more detailed drawing of sensor 14 is shown in FIGS. 2 and 3. Sensor 14 includes a sensor housing 32 and a spool-like actuator 34 which shuttles back and forth, as indicated by arrow 36, in response to alternating vortices. Both sensor housing 32 and actuator 34 are constructed from high temperature, low corrosive materials, such as stainless steel. The active parts of sensor 14 are contained by sensor housing 32 and are designed to have a low mass. The importance of designing the active parts so that they have a low mass will be discussed in greater detail below.

In the preferred embodiment, sensor housing 32 is fabricated by boring cylindrical bores 38a, 38b (FIG. 3), which are approximately 1.3 centimeters in diameter, on opposite sides of sensor housing 32, leaving a center member 40 in which a channel 42 is formed. Two interconnected cavities 44 and 46, each approximately two millimeters deep, are thereby formed. Actuator 34, which primarily consists of an axle 52 and flanges 54 and 56 connected at each end of axle 52, is positioned within bores 38 and held in Place by diaphragms 48 and 50 (FIG. 2). Axle 52 is sized to be slideably disposed within channel 42 to permit flanges 54 and 56, to shuttle back and forth within cavities 44 and 46. Flanges 54 and 56 are approximately 11 millimeters in diameter and 2 millimeters thick. Diaphragms 48 and 50, approximately 75 micrometers thick and sufficiently flexible to allow actuator 34 to shuttle back and forth in response to vortex pressure, hermetically seal each cavity 44 and 46 from the flow of fluid in meter body 12.

Sandwiched between each flange 54, 56 and center member 40 is a piezoelectric sensing element 62, 64 and biasing mechanism 58, 60. Sensing elements 62 and 64 are preferably lithium niobate piezoelectric crystals, which are Z cut. The advantages of using a lithium niobate piezoelectric crystal over other types of crystals is its ability to remain piezoelectrically active while continuously operating at high temperatures such as 800 degrees F. (Their Curie temperature is 2102 degrees F.). According to the preferred embodiment, both crystal Polarities are facing the same direction. In other words, the positive face of one crystal and the negative face of the other crystal are in contact with center member 40 which serves as both an electrical and mechanical ground. When assembled in this manner, both crystals produce the same polarity signal for a flow signal which shuttles actuator 34 back and forth as indicated by arrow 36.

This will be discussed in greater detail below.

Biasing mechanisms 58 and 60 preferably consist of Belleville washers 66 and 68 made of suitable spring alloy for high temperatures and insulating disks 70 and 72, preferably made of ceramic. Bias mechanisms 58 and 60 serve to uniformly apply compressive force on each sensing element 62 and 64 to keep all of the pieces of the sensing mechanism in intimate contact with each other. Other suitable biasing means can also be used. For example, a helical spring may be used in place of the Belleville washer.

Crystals 62 and 64 are placed in sensor housing 32 with one face in electrical contact with center member 40 which serves as both the electrical and mechanical ground for the sensor mechanism. Sensing circuitry 78 is connected to the crystals via leads 80 and 82 which are connected to foil discs 84 and 86. Foil discs 84 and 86 are disposed between insulators 70 and 72 and sensing crystals 62 and 64, and are kept in contact with the crystals by bias means 66 and 68. Foil disks 84 and 86 are approximately 11 mm in diameter and 50 micrometers thick.

Sensing circuitry 78 is preferably located remotely from sensor body 14 to protect it from extreme temperatures. As shown, electrical leads 80 and 82 are rigidly supported by a dual bore ceramic tube 88. Ceramic tube 88 is encased by a stainless steel extension tube 90 which is welded leak tight to sensor housing 32. Leads 80 and 82 can be brazed or welded to a ceramic to metal electrical feedthrough (not shown) welded leaktight to the extension tube. This allows the sensor to be evacuated and filled with a dry gas for preventing degradation of the sensor.

During operation of the meter, vortices generated by shedder 16 apply an alternating differential pressure across the two sides of the sensor 14. As a result, actuator 34 shuttles back and forth (as indicated by arrow 36) causing one Belleville washer to further compress slightly while simultaneously relaxing the other slightly. This in turn creates an increasing stress on one crystal while simultaneously decreasing the stress on the other. These alternating stress variations cause alternating charges to be generated at the faces of each crystal which are measured by sensing circuitry 78.

An important feature of this sensor construction is that it is insensitive to line pressure fluctuations such as those commonly caused by pump impeller rotation. These pressure fluctuations travel down the pipe at sonic velocities and arrive at both sides of the sensor simultaneously and are referred to as common mode noise. These pressure fluctuations can be substantially greater than the alternating differential pressure signals created by vortex shedding, particularly at low flow rates. If the sensor were affected by common mode pressure fluctuations, an erroneous readout could result. Since the two diaphragms 48 and 50 have essentially the same effective area and are coupled to each other via spool-like actuator 34, pressure fluctuations which arrive simultaneously at both sides of sensor 14 create no net force on crystals 62 and 64. In other words, equal and opposite forces are generated and no motion of the shuttle occurs. As a result, no additional stresses are transferred to the crystals and no charges are generated by either crystal. Thus, the mechanical structure results in no net signal generation by these line pressure fluctuations.

Common mode signals can also cause very slight and simultaneous bending of both spool flanges 54 and 56, resulting in a simultaneous increase (or decrease) in stress on both crystals. Since the stress on both crystals is changing in phase, whereas the stresses created by vortices 26 and 28 are changing 180 degrees out of phase, the resulting signal responsive to common mode pressure changes can be electronically cancelled.

A sensor constructed in this manner is also inherently insensitive to mechanical vibrations. Lateral pipe vibrations (vibration that is parallel to the shuttle direction of the sensor) are not an important factor because the sensor has a very small active mass (approximately 2 grams). For example, a "1 g" vibration produces a 2-grams lateral force, which is less than the force produced by vortex shedding at flow ranges of interest. The sensor is insensitive to vibrations either along the flow direction or in the vertical direction because, in addition to the very small sensor mass, these vibrations create shear stress on the crystals, and crystals polarized through their thickness are insensitive to shear stress.

Signals can be generated, however, by both crystals when a common mode pressure signal, such as that arising from pulsating flow, is applied to the sensor. These signals can occur if the mechanical characteristics of the sensor are less than ideal. The mechanical response can be of two forms. First, due to the lack of symmetry of a sensor, the crystals can be compressed or relaxed unequally. For example, one of the diaphragms may be more flexible or have a larger surface area than the other and may therefore be more sensitive to pressure variations. These types of symmetry variations result in differential pressures that are similar to forces arising in the vortex field when flow is present. These signals can not be distinguished from the flow signal. Therefore, symmetry is an important consideration during the manufacture of the sensor.

The second type of mechanical response that can occur is due to the non-rigidity of actuator 34 which could cause compression on both crystals to be increased or relaxed simultaneously. In other words, each flange, 54 and 56 could bend or the axle could be compressed under pressure. Electronically, this type of response can be distinguished and eliminated from the signals generated by shedding vortices because the two crystals will produce small signals of opposite polarity. The preferred circuitry for eliminating these signals is discussed in greater detail below.

Figure 4:
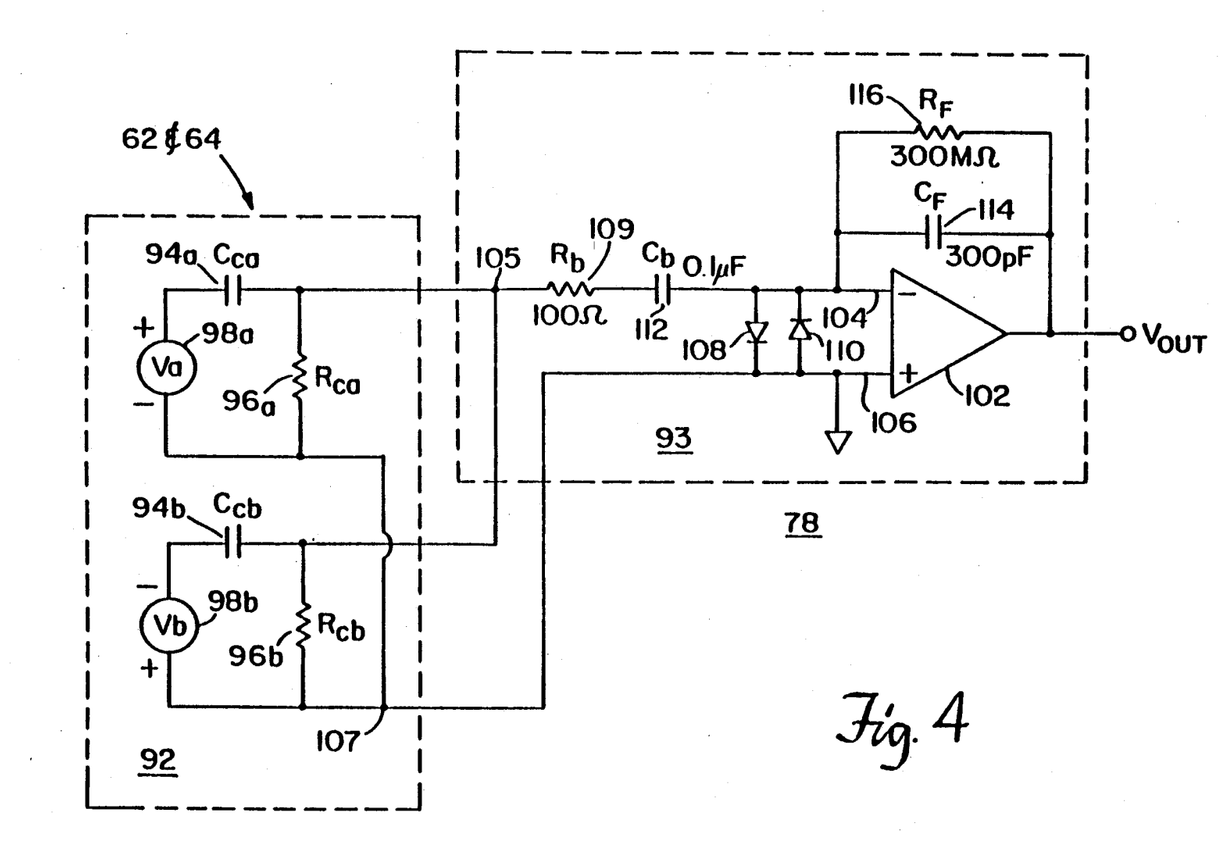
FIG. 4 is a schematic diagram illustrating circuitry used to detect charge variations in the piezoelectric sensor of FIG. 2, which are generated in response to pressure variations transmitted to the sensor by the vortex shedder.

The preferred circuitry 78 for detecting vortices is shown in FIG. 4. This circuitry shows a circuit 92 which is an electrical equivalent of the crystals and a charge amplifier 93. As shown, this approach requires that the two piezoelectric crystals be mounted so that the polarities of the two crystals in contact with center member 40 are opposite, as discussed above. This ensures that when both crystals are simultaneously compressed or relaxed the charge developed across the crystals, as detected by electrodes 80 and 82, will be equal in magnitude (if the crystals are identical and the mechanical components symmetric), but opposite in sign.

Circuit 92 includes crystal capacitors 94$a$ and 94$b$ and crystal resistance 96$a$ and 96$b$ connected in series with voltage sources 98$a$ and 98$b$ for each crystal. Charge amplifier 93 includes an operational amplifier 102 having a negative terminal 104 interconnected through resistor $R_b$ 109 and capacitor $C_b$ 112, to a node 105 between crystal resistances 96$a$, 96$b$ and capacitors 94$a$, 94b. A positive terminal 106 of operational amplifier 102 is interconnected to a node 107 between voltage sources 98a, 98b and resistors 96a, 96b, and is tied to ground. Two oppositely-poled diodes 108 and 110 are connected between terminals 104 and 106, as shown to limit the magnitude of the signals reaching the input terminals of amplifier 102. Charge amplifier 93 also includes a feedback loop, which includes a feedback capacitor 114 and a feedback resistor 116.

Since an operational amplifier characteristically has a small dc potential at its input, referred to as its zero offset voltage, operational amplifier 102 will attempt to force a constant current to flow through feedback capacitor 114. If a constant current were allowed to flow through feedback capacitor 114, the voltage across it would increase linearly with time. Eventually, this voltage will cause the output of the operational amplifier to saturate. This condition is avoided by feedback resistor 116, which is placed in parallel with feedback capacitor 114. This resistor provides an alternative path for this constant current. As a result, the voltage across the feedback loop is a small fixed value which is independent of time. A resistor 109 and a capacitor 112 are connected in series between node 105 and negative terminal 104 to limit the gain of the circuit at high and low frequency.

The charge amplifier is necessary to detect electrical responses from the lithium niobate crystals because characteristically they have very low capacitance. For example, these crystals have a dielectric constant of approximately 30, as compared to PZT5A piezoelectric crystals, which have a dielectric constant at room temperature of approximately 1700. Further, tests have indicated that the resistance of these type of crystals drops off sharply as temperature increases. Therefore, using a voltage amplifier would be impractical. At very high frequencies and low temperatures the full crystal voltage would appear across the amplifier. At low frequencies, and/or high temperatures, most of the crystal voltage would appear across its capacitor and not across the input to the voltage amplifier.

Charge amplifier 93 operates by maintaining negative terminal 104 of operational amplifier 102 at a potential close to ground. As a result, there is essentially no potential difference across crystal resistors 96a and 96b. The charge that appears across the crystals due to an applied stress is nullified by charge flowing from the feedback capacitance 114 to force the potential at negative terminal 104 close to ground.

When differential pressure generated by alternating vortices forces the actuator to shuttle to one side of the sensor housing, increasing stress on one crystal while relaxing the stress on the other crystal, a positive or negative net charge develops at node 105. Charge amplifier 93 senses this net charge and cancels it by delivering an equal and opposite charge to the crystals. As a result, operational amplifier 102 generates an output voltage (Vout) that is proportional to the net charge across the crystals. The frequency of this voltage signal is then measured to indicate the frequency of the vortices.

Ideally, signals generated by the two crystals as a result of a common mode pressure signal are completely eliminated, if the mechanical and electrical components are symmetric, by simple subtraction or cancellation at node 105. For an asymmetrical sensor, the net common mode signal at node 105 is significantly reduced.

Figure 5:
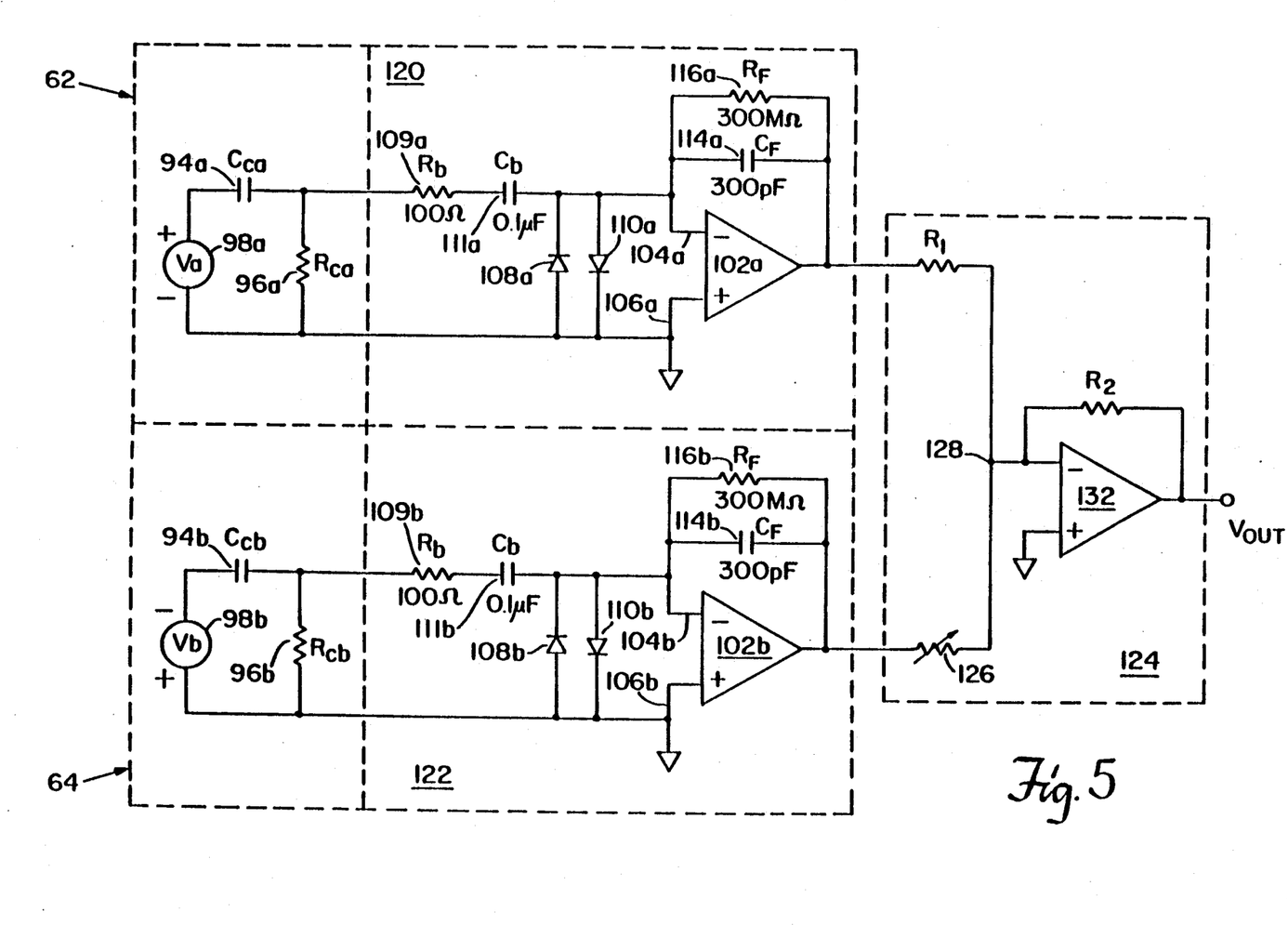
FIG. 5 is a schematic diagram of an alternate circuit used to detect variations in charge of the piezoelectric sensor.

In the event the rigidity of the actuator is not sufficiently high, and if, in addition asymmetries in the mechanical and electrical components of the sensor exist, the electrical responses from the two crystals in the presence of a common mode pressure signal may not be sufficiently equal in magnitude to allow for elimination by cancellation as outlined above. As shown in FIG. 5, this problem can be solved by employing two charge amplifiers 120 and 122, one for each crystal. Note that charge amplifiers 120 and 122 are essentially equivalent to charge amplifier 93, as shown in FIG. 4, and that the crystals are mounted in a similar manner as described above, i.e. the polarities of the two crystals with respect to center member 40 are opposite. The common mode noise resulting from these asymmetries is eliminated by adjusting the relative value of the amplifier outputs, using an adjustable resistor 126 of a summing circuit 124, to equalize the output signals of charge amplifiers 120 and 122 prior to cancellation at node 128. Summing circuit 124, which includes an amplifier 132, is a common circuit known to one skilled in the art.

Figure 6:
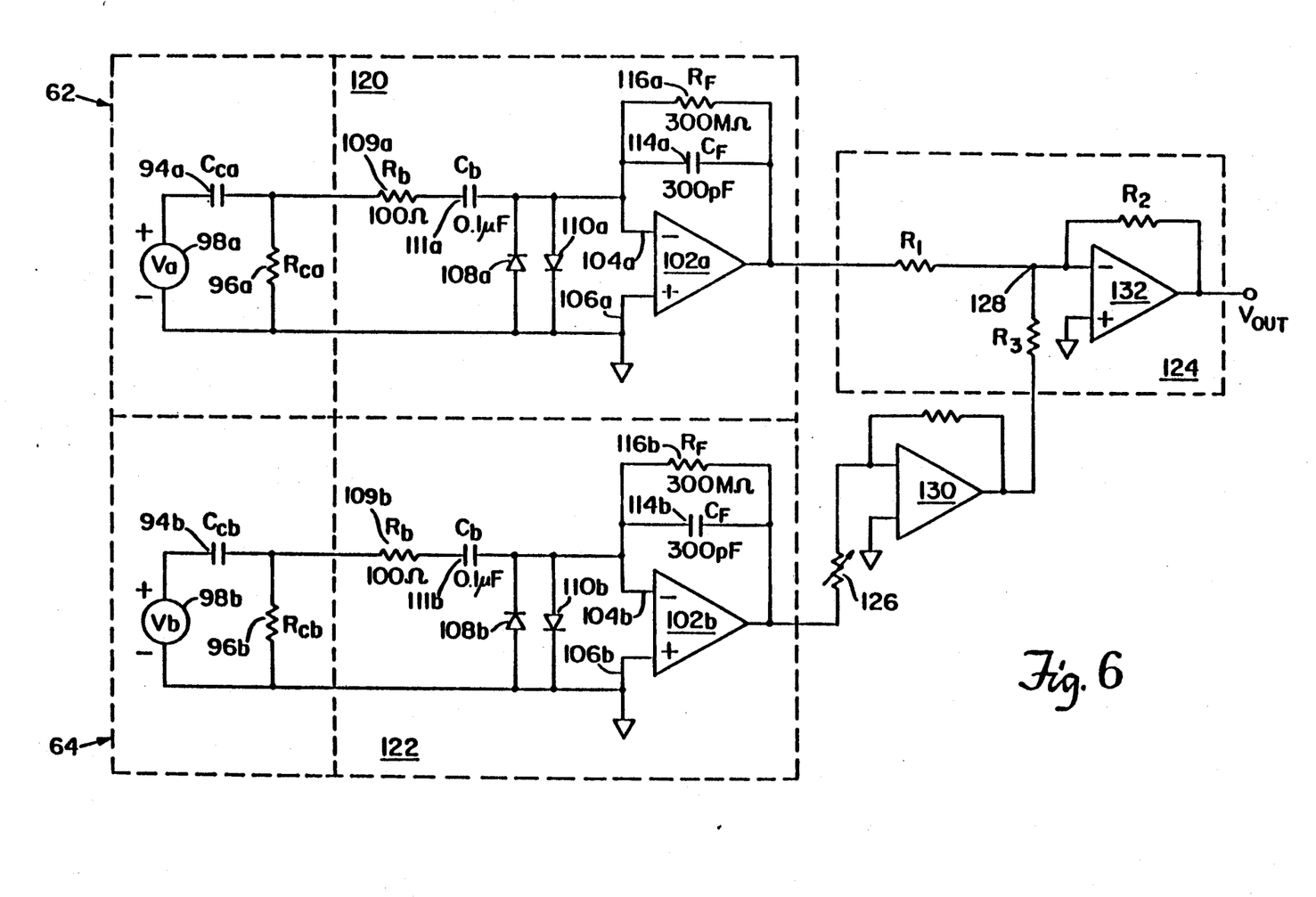
FIG. 6 is a schematic diagram of another alternate circuit used to detect variations in charge of the piezoelectric sensor.

In the above implementation (FIG. 5), the sensor could be assembled with common polarities of the two crystals in contact with center member 40 as shown in FIG. 6. The signal processing circuit for that embodiment includes an inverter 130 to invert the signal generated by one of the crystals, before summing the signals together as described above.

While this invention has been particularly shown and described with reference to preferred embodiments thereof, it will be understood by those skilled in the art that various changes in form and details may be made without departing from the spirit and scope of the invention as defined in the appended claims. For example, other piezoelectric crystals such as lithium tantalate or quartz crystals, or piezoelectric ceramics are sensing elements which may be used depending on the application. For these crystals the use of a voltage amplifier circuit may be desirable to detect signals generated by the crystals. Further, it will be understood by one skilled in the art that the shuttle design of the sensor could be fabricated with only one piezoelectric element. Due to asymmetries in the sensor, however, the common mode rejection ratio would not be as great as with two elements as described in the preferred embodiment.

It has been found that the performance of a sensor system as described above, when placed in a high temperature environment, can be subject to deterioration over time. Specifically, at elevated temperatures the resistivity of the sensing elements can drop from an initial value of several megohms ($10^7$) to a value as low as a kilohm ($10^3$). When this occurs, the sensing signal is reduced and the ratio of that signal to thermal noise generated within the sensing element becomes quite low. Even though the Curie temperature $T_c$ of the lithium niobate sensor elements is 2100° F., the aforesaid effects can become manifest in the sealed housing of the described transducer assembly at much lower operating temperatures, for example, at 700° F. This aging effect is believed to be due to leaching of oxygen from the lithium niobate crystal structure as a result of the incorporation of oxygen into the metallic parts within the sensor housing, resulting in a depletion of free oxygen within the housing.

A further inventive feature addresses this problem of sensor deterioration by providing in the housing a means for preventing such change or degrading of the sensing element crystal structure. This is done in a preferred embodiment by providing diffusion barriers to prevent loss of oxygen from the crystals. In further or alternative constructions sensor lifetime is extended by assuring that the partial pressure of oxygen within the housing is maintained or is replenished above the level at which a net outmigration of bound oxygen from the crystal structure occurs. That level depends on the intended operating environment temperature. For a detailed description of the dependence of the crystal properties on oxygen partial pressure, see the paper "The Electrical Conductivity of LiNbO$_2$" by G. Bergmann in Solid State Communications. Vol. 6 pp. 77–79, Pergamon Press, 1968.

Figure 2A:
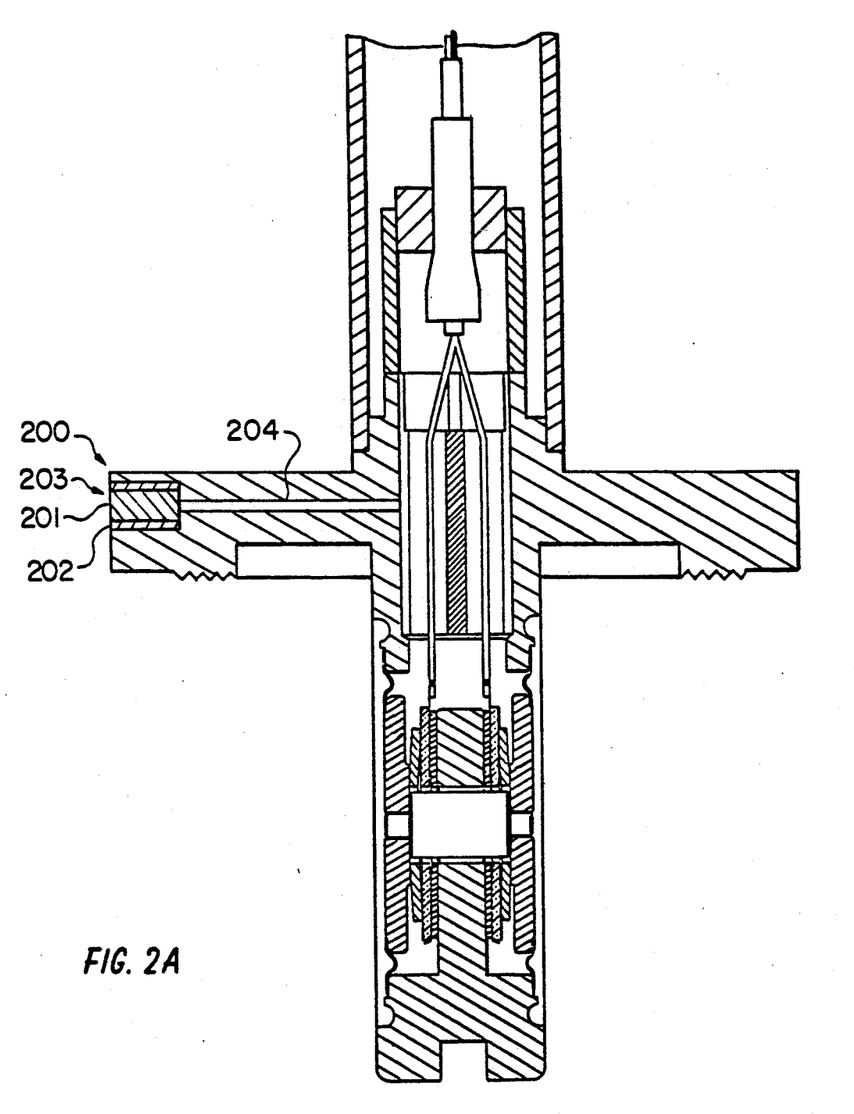
FIG. 2A is a corresponding view of another embodiment.

One embodiment of this aspect of the invention, illustrated in FIG. 2A, accomplishes this by provision of a breather structure 200 communicating between an oxygen atmosphere, e.g., atmospheric air, and the interior of housing 32. The Figure shows a sensor and housing assembly otherwise substantially identical to that illustrated in FIG. 2, with corresponding parts labelled by identical numbering.

As illustrated, the breather structure 200 includes a controlled leak restrictor element 201 mounted in a securing sleeve 202 and fixed in a counterbore 203 of the sensor housing 32 such that it communicates between atmospheric air and, via passage 204, the interior of the housing. The restrictor can, for example, be fabricated of a microporous sintered metal, and have a small cross-sectional area on the order of a square millimeter. The restrictor can have a leakage rate, for example, of $10^{-6}$ to $10^{-4}$ scc/sec measured in nitrogen at 30 psig, its purpose being to allow diffusion of oxygen from the surrounding atmosphere into the housing interior at a rate such that the oxygen partial pressure within the cavities is always sufficient to prevent degradation of the sensor crystals.

A suitable element for this purpose is the microporous vent controlled leak restrictor assembly sold by the Mott Metallurgical Corporation of Farmington, Conn. under their catalog designation as design code 5000, size ⅛ inch, leakage $10^{-4}$ scc/sec ±50% at 30 psi.

This embodiment is suitable for use in a sensing environment in which the sensed process fluid flowing through the meter body 12 (FIG. 1) is relatively benign, e.g. is a non-toxic and non-reactive fluid such as steam. The diaphragms 48, 50 provide a primary seal between the sensed fluid flow and the surrounding ambient, and sintered restrictor element 201 acts as a secondary seal, so that in the event of a failure in diaphragm 48 or 50 (FIG. 2), which normally keeps the fluid out of the sensor housing, only minor amounts of fluid can escape the housing. The leakage assembly 200 and its mounting are dimensioned to withstand four times the mean vapor pressure of the fluid which is being sensed, e.g., to withstand 4×1500 psi pressure for a typical steam generator application.

Figure 2B:
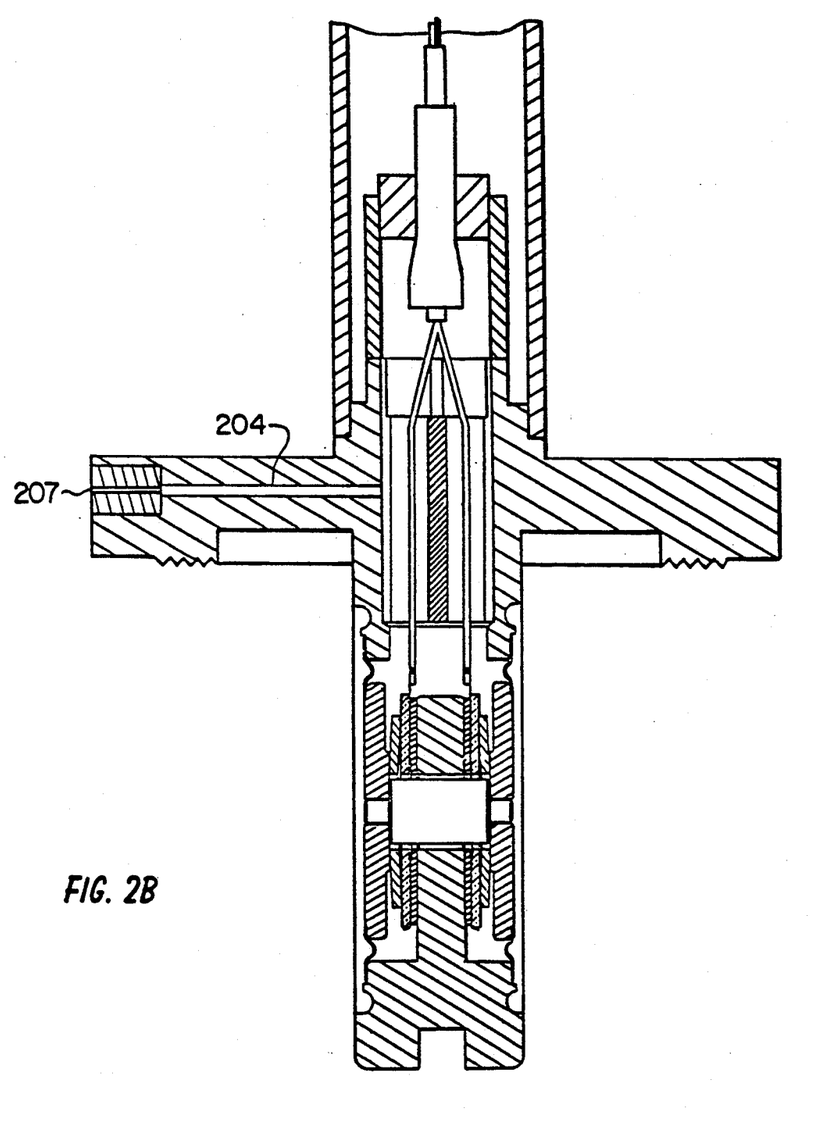
FIG. 2B, 2C show details of alternate constructions similar to the embodiment of FIG. 2A.
Figure 2C:
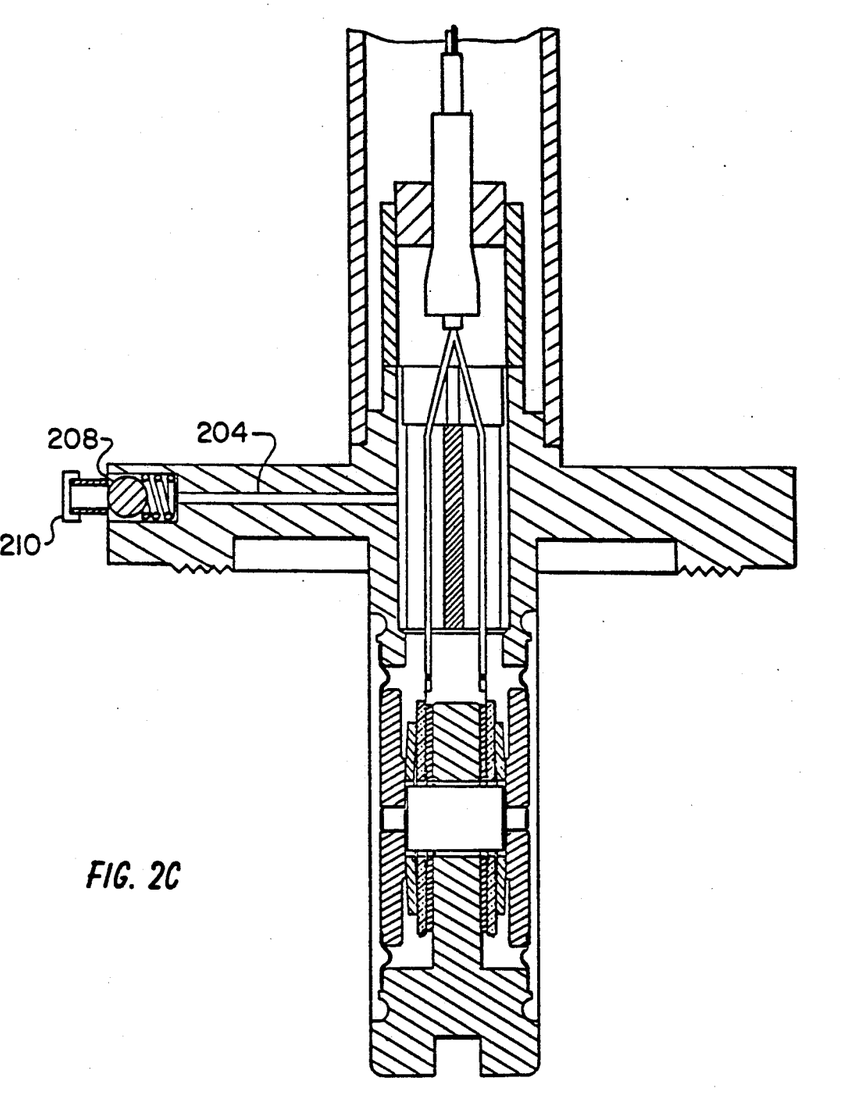

In another embodiment, a different leak restrictor element, such as a capillary tube vent, is used in place of a microporous vent. For example, element 201 can be replaced by a mounted 0.005" i.d. capillary tube 207 as shown in FIG. 2B. In this case, the leakage rate is slightly higher than for a sintered restrictor, but still low enough so that leakage of steam at 700° F. does not pose a hazard. Each of the foregoing embodiments provides a controlled oxygen diffusion path to the atmosphere so that the oxygen partial pressure in the housing interior surrounding the piezoelectric elements is maintained at about its normal atmospheric level. This has been found to prevent or substantially retard deterioration of the lithium niobate sensor characteristics.

In accordance with another embodiment of the invention, the elements of the assembly located in or communicating with the interior of the housing 32 are preconditioned by an initial burning-in procedure before sealing the crystal sensors within the housing. The burning-in pre-oxidizes the exposed surfaces in the housing interior, and drives off organic material which might otherwise deplete oxygen inside the housing. In one practice of this embodiment of the invention, the entire sensor assembly was heated to a temperature of approximately 875° F. and maintained at that temperature for several hours while the interior of the assembly was vented to the atmosphere. The housing was then sealed. When used thereafter in a sensing environment, the piezoelectric crystals maintained a high resistivity and signal-to-noise ratio even after prolonged operation at 700° F. Eventually the sensor performance deteriorated, by a mechanism believed to be due to deeper diffusion of oxygen into and oxidation of the housing walls, which eventually depleted the available free oxygen concentration.

Other embodiments of the invention are also contemplated, and may be applied either instead of, or in addition to, one of the foregoing practices.

In accordance with one such other embodiment, the housing interior is not vented, but rather is filled with pure oxygen under a sufficient pressure to assure that the oxygen level remains adequate despite oxygen uptake by the oxidation that occurs during subsequent operation in a high temperature environment. Alternatively or in addition, a recharging valve is provided, such as a check valve 208 and removable sealing cap 210, as illustrated in FIG. 2B, to allow the periodic charging and replenishment of oxygen within the housing. Applicant has found that by providing a charge of oxygen into the housing of an already-deteriorated sensor unit, the sensor can be made to revive and regain its original signal transducing characteristics. Accordingly the invention also contemplates a method of reviving aged sensors by providing a charge of oxygen, preferably at an enriched concentration, high temperature, or both to reverse the oxygen depletion of the sensor materials.

In accordance with yet another embodiment of the invention, the depletion of oxygen from the housing interior, and hence from the piezoelectric elements, is prevented by passivating the interior of the housing so that it no longer reacts with available oxygen during operation in the hot environment. For example, the stainless steel housing elements may be dipped in nitric acid prior to assembly to remove organic or other oxidizable material and passivate the exposed metal surfaces by deeply oxidizing them.

It should be understood that while this aspect of the invention has been illustrated with respect to lithium niobate sensor elements operating in a particular vortex shedding sensing assembly, the concept of the oxygen maintenance aspect of this invention is broadly applicable to other sensor assemblies wherein exposed piezoelectric elements are mounted in a cavity sealed off from a flow of fluid, and are subjected to temperatures at which an evolving ambient in the cavity degrades the sensor's electrical properties. Further, except in cases of direct physical incompatibility of the different embodiments described above, such as between the constructions involving controlled venting and those involving sealing a cavity, the foregoing constructions may be employed either separately, or together in combinations of two or more. Thus, for example, the housing may be passivated and oxidized by an acid bath, oxidized at a high temperature, and then either sealed, closed with an oxygen excess, or vented by a controlled leakage restrictor to the surrounding atmosphere. Other combinations and subcombinations are also contemplated, within the general concept of the invention.

Figure 2D:
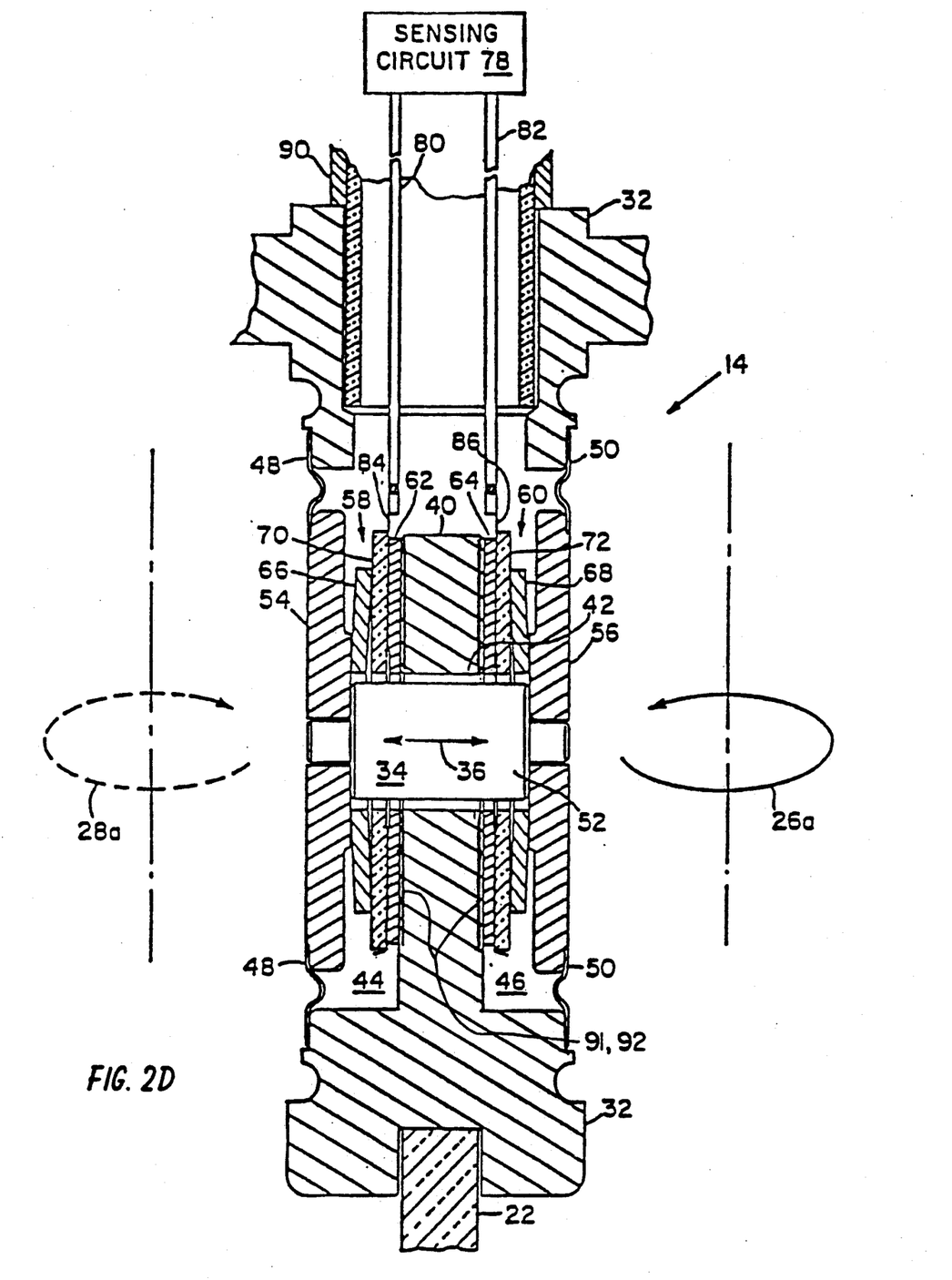
FIG. 2D, 2E show details of sealed constructions of related embodiments of the invention.

A presently preferred embodiment retains the hermetically sealed character of the assembly of FIG. 2, and limits the effects of oxygen depletion by providing a surface barrier that substantially isolates the sensing crystals. FIG. 2D illustrates such an embodiment, wherein the broad inner face of each lithium niobate crystal 62, 64 is covered by thin metal film 91, 92 made of a material which is highly resistant to oxidation at high temperatures. Suitable materials are 310 stainless steel, Inconel 600, nickel, platinum or chromium. Preferably the electrode foil pieces 84, 86 are also made of similarly oxidation resistant material. Barrier elements 91, 92 may be formed directly on the crystal face by sputtering, electroplating or the like, or may be formed as separate washers of foil or shim stock; films 91, 92 limit the area of the crystal that is exposed to contact with a depleted-oxygen atmosphere or an oxygen-leaching material, and by providing a surface seal, limit the transport of oxygen from the crystal structure.

In this embodiment, the exposed interior metal or oxidizable faces of the housing assembly are preferably passivated by pre-oxidizing them with nitric acid prior to assembly.

While it is too early in the testing of the devices passivated in this manner to determine if pre-oxidation will assure a sufficiently long sensor lifetime (e.g., ten years), other forms of passivation may be employed to assure for longer times that the housing does not rob oxygen from the sensor. For example, coating the housing interior with a noble metal, such as platinum, would eliminate a major source of oxygen scavenging.

Figure 2E:
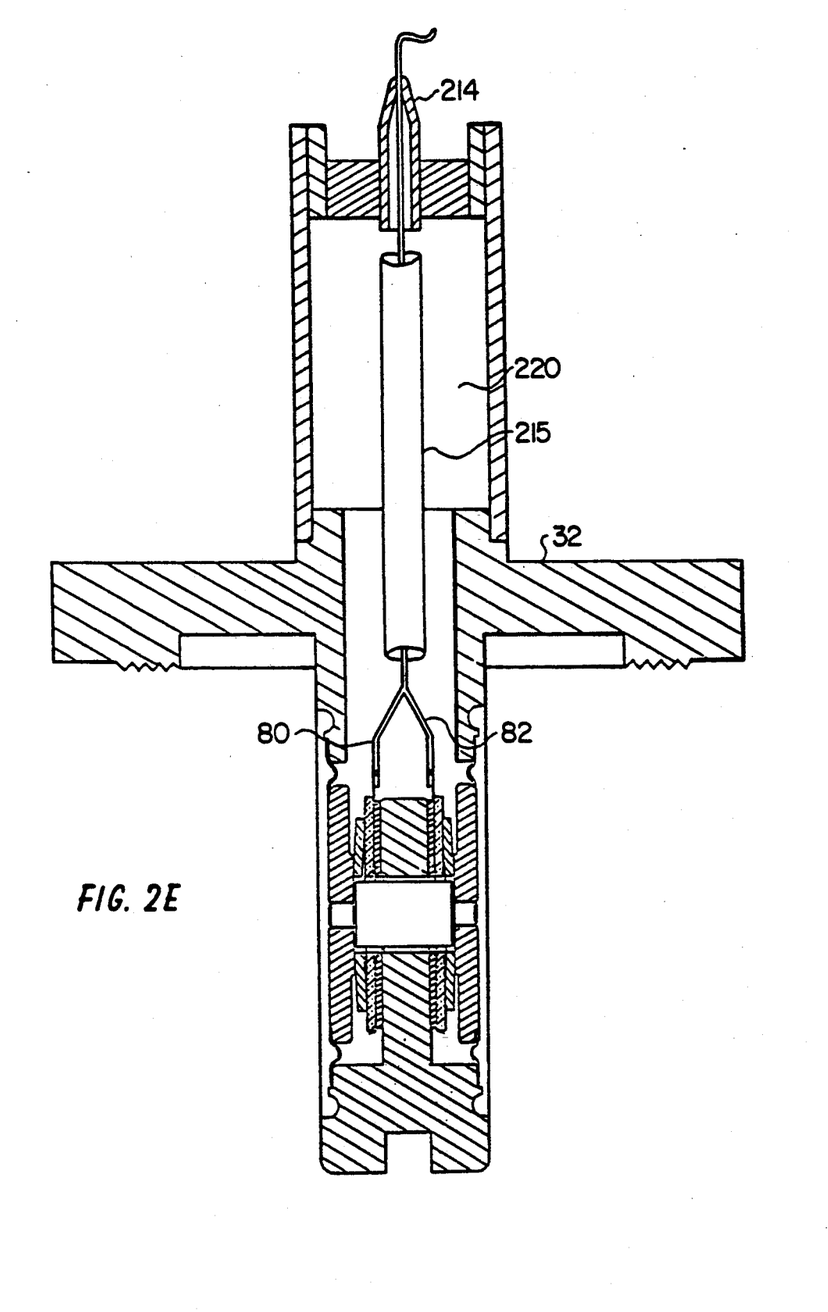

FIG. 2E shows a related embodiment of the invention. In this embodiment, an enlarged chamber 220 is sealingly attached to the sensor housing and is filled with oxygen to provide a substantial reservoir of oxygen in communication with the sensor crystals. The excess of oxygen assures that oxygen is not depleted below the critical threshold by the surface oxidation that occurs within the sensor's useful lifetime. The electrical leads 80, 82 are protected within an insulating sheath 215, and exit the housing through a ceramic insulator 214. The enlarged chamber 220 may also be provided on the sealed embodiment of FIG. 2D.

The invention being thus disclosed, various modifications and diverse embodiments thereof will occur to those skilled in the art, and such modifications and other embodiments are understood to fall within the scope of invention, as defined by the claims appended hereto.

What is claimed is:

1. A piezoelectric differential pressure sensor comprising:
   a sensor housing having an interior including a first and a second cavity interconnected by a channel
   a spool-like actuator having an axle slideably disposed in the channel for allowing each of two flange members, connected proximate to each end of the axle, to shuttle back and forth relative to the sensor housing in response to forces applied to the flange members
   piezoelectric sensing means disposed in the interior between the flange members and the sensor housing, for generating signals in response to force mechanically applied to the sensing means by the flange members of the actuator, and
   means for controlling migration of oxygen from the piezoelectric sensing means to retard aging thereof.

2. The sensor as claimed in claim 1, wherein the means for controlling migration includes a barrier film covering a substantial surface portion of the piezoelectric sensing means.

3. The sensor as claimed in claim 1, wherein the piezoelectric sensing means is sealed from a sensed fluid, and said means for controlling migration includes means for providing an oxygen partial pressure through a secondary seal located between the surrounding atmosphere and the housing interior forming a limited rate diffusion path for entry of oxygen into the interior.

4. The sensor as claimed in claim 1, wherein the piezoelectric sensing means is a lithium niobate crystal.

5. The sensor as claimed in claim 1, wherein the means for controlling migration includes a sintered porous plug between the interior and the surrounding atmosphere to allow limited gas flow therebetween and maintain a threshold oxygen partial pressure in the interior.

6. The sensor as claimed in claim 1, wherein the piezoelectric sensing means includes first and second sensing elements, and further comprising means for detecting signals generated by the sensing means, including
   a charge amplifier interconnected to each sensing element for amplifying signals generated by each of the sensing elements, and
   a summer circuit for combining output signals of each amplifier to reduce common mode noise.

7. A vortex sensor for a vortex-shedding flowmeter that measures a flow rate of a fluid flowing through a flow passage by detecting alternating pressure variations generated by a shedding body placed in the flow passage, the vortex sensor comprising
   a sensor housing
   two piezoelectric sensing means arranged within the sensor housing for generating signals in response to alternating pressure variations applied to each sensing means, the two piezoelectric sensing means being connected so that a common pressure variation applied equally to both produces substantially matched signals of opposite polarity which cancel each other,
   means forming a controlled leak restrictor providing a diffusion path for atmospheric oxygen to reach the two piezoelectric sensing means, and
   means interconnected with the piezoelectric sensing means, for detecting the signals generated by each of the piezoelectric sensing means to determine the flow rate of the fluid.

8. The vortex sensor of claim 7, wherein the piezoelectric sensing means comprises a lithium niobate piezoelectric crystal.

9. In pressure transducer apparatus of the type having a piezoelectric sensing element mounted in an interior of a housing for placement within a sensing environment to transduce pressure variations of the sensing environment and produce corresponding electrical signals, and wherein the piezoelectric sensing element is formed of a crystalline lithium niobate having an ordered lattice structure resulting in defined electrical characteristics for generating said signals, the improvement comprising means in the housing for retarding chemical change of the order lattice structure by maintaining an oxygen partial pressure within said housing above a threshold value.

10. In transducer apparatus according to claim 9, the improvement wherein the means for maintaining includes a controlled leak restrictor.

11. In transducer apparatus according to claim 9, the further improvement wherein said means includes an oxidized element in the interior of the housing.

12. In transducer apparatus of the type having a piezoelectric sensing element mounted in an interior of a housing for placement within a sensing environment to transduce pressure variations of the sensing environment and corresponding electrical signals, wherein the piezoelectric sensing element is formed of a chemical compound having an ordered lattice structure resulting in defined electrical characteristics for forming said signals, said piezoelectric sensing element being isolated from said environment by a seal which is subject to failure in use, the improvement comprising means for providing a defined oxygen partial pressure in said interior by communicating with ambient atmosphere while restricting outflow therefrom so that in case of seal failure within said housing, the fluid of said sensing environment is restricted from escaping through said means for providing a defined oxygen partial pressure.

13. In transducer apparatus according to claim 12, the further improvement wherein said means for providing a defined oxygen partial pressure comprises a controlled leakage rate restrictor communicating with said interior and having a leakage in the range of $10^{-6}$ – $10^{-4}$ scc/sec at 30 psi.

14. In transducer apparatus according to claim 13, the further improvement wherein said means for providing a defined oxygen partial pressure comprises a sintered microporous restrictor.

15. In transducer apparatus according to claim 12, the further improvement wherein said means for providing a defined oxygen partial pressure comprises pre-oxidized surface elements provided in the interior of the housing.

16. A pressure sensor apparatus comprising
a sensor housing for holding a sensing element
a lithium niobate sensing element mounted in an opening in the sensor housing and in mechanical communication with a sensed medium located exteriorly thereof
said sensor housing including sealing means interposed between the sensed medium and the sensing element for sealing the opening, and
means forming a controlled leakage restrictor constituting a diffusion path between the lithium niobate sensing element and the surrounding atmosphere, whereby sufficient oxygen enters the sensor housing to counteract or prevent deterioration of the sensor element, while only negligible quantities of the sensed medium reach the surrounding atmosphere in the event of failure of said sealing means.

17. Pressure sensor apparatus according to claim 16, wherein the controlled leakage restrictor includes a capillary tube venting the interior of the housing.

18. Pressure sensor apparatus according to claim 16, wherein the controlled leakage restrictor includes a porous sintered element having a strength to withstand a pressure level over 1000 psi.

19. A vortex sensor for a vortex-shedding flowmeter for measuring a flow rate of a fluid flowing along a flow passage by detecting alternating pressure variations generated by a shedding body placed in the flow passage, said vortex sensor comprising
a sensor housing for providing a fixed support extending into a flow passage and having first and second sides spaced apart along an axis transverse to fluid flow,
a coupling assembly extending between said first and second sides and movably supported in the sensor housing for receiving fluid pressure forces from said first and second sides and moving back and forth along said axis responsive thereto,
at least first and second piezoelectric sensing means mechanically coupled between said sensor housing and said coupling assembly for receiving the fluid pressure forces from said coupling assembly, each said piezoelectric sensing means having poling oriented along said axis thereby achieving substantial immunity to noise and producing vortex-indicating electrical output signals representative of fluid pressure applied to opposing sides of the coupling assembly.

20. A vortex sensor according to claim 19, wherein the first and second sensing means are arranged with opposite poling and are spaced along said axis and coupled between the coupling assembly and the housing such that increase pressure at the first side increases pressure applied to the first sensing means while reducing pressure applied to the second sensing means, and increased pressure applied to the second side applies increased pressure to the second sensing means while reducing pressure applied to the first sensing means.

21. A vortex sensor according to claim 20, further comprising a charge amplifier connected in a nulling feedback loop to provide a feedback signal to said first and second sensing means to cancel the vortex-indicating electrical output signals, frequency of the feedback signal equalling the frequency of sensed vortices in the fluid, thereby providing a measure of fluid flow.

22. A vortex sensor according to claim 19, further comprising means in the sensor housing for preventing loss of oxygen from the piezoelectric sensing means.

23. In pressure transducer apparatus of the type having a piezoelectric sensing element mounted in an interior of a housing for placement within a sensing environment to transduce pressure variations of the sensing environment and produce corresponding electrical signals, and wherein the piezoelectric sensing element is formed of a chemical compound having an ordered lattice structure resulting in defined electrical characteristics for generating said signals, the improvement comprising
means in the housing for retarding chemical change of the ordered lattice structure, said means for retarding including an oxygen-filled chamber in communication with the interior of said housing.

24. In pressure transducer apparatus of the type having a piezoelectric sensing element mounted in an interior of a housing for placement within a sensing environment to transduce pressure variations of the sensing environment and produce corresponding electrical signals, and wherein the piezoelectric sensing element is formed of a chemical compound having an ordered lattice structure resulting in defined electrical characteristics for generating said signals, the improvement comprising
means in the housing for retarding chemical change of the ordered lattice structure, said means for retarding including a barrier film placed over a major surface portion of the piezoelectric sensing element for providing a barrier to loss of oxygen from the surface portion.

* * * * *